United States Patent
Rothschild et al.

(10) Patent No.: US 11,242,006 B2
(45) Date of Patent: Feb. 8, 2022

(54) VEHICLE DOOR MIRROR ASSEMBLY

(71) Applicant: Honda Motor Co., Ltd., Tokyo (JP)

(72) Inventors: Jacob A. Rothschild, Marysville, OH (US); Oscar A. Caraan, Delaware, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 267 days.

(21) Appl. No.: 16/517,962

(22) Filed: Jul. 22, 2019

(65) Prior Publication Data

US 2021/0023999 A1    Jan. 28, 2021

(51) Int. Cl.
*B60R 1/06*        (2006.01)
*B60R 11/00*      (2006.01)

(52) U.S. Cl.
CPC ........... *B60R 1/06* (2013.01); *B60R 2011/004* (2013.01)

(58) Field of Classification Search
CPC .............................. B60R 1/06; B60R 2011/004
See application file for complete search history.

(56) References Cited

U.S. PATENT DOCUMENTS

| | | | |
|---|---|---|---|
| 4,268,120 A * | 5/1981 | Jitsumori | B60R 1/10 248/483 |
| 4,701,037 A | 10/1987 | Bramer | |
| 5,621,577 A | 4/1997 | Lang et al. | |
| 7,044,612 B2 | 5/2006 | Centmayer et al. | |
| 7,370,985 B2 * | 5/2008 | Boddy | B60R 1/072 248/478 |
| 8,047,665 B2 | 11/2011 | Henion et al. | |
| 8,858,002 B2 | 10/2014 | Suzuki | |
| 2013/0067719 A1 | 3/2013 | Suzuki et al. | |
| 2013/0070358 A1 * | 3/2013 | Suzuki | B60R 1/072 359/877 |

* cited by examiner

*Primary Examiner* — James M Pontius
*Assistant Examiner* — Tyler B Edwards
(74) *Attorney, Agent, or Firm* — Rankin, Hill & Clark LLP

(57) ABSTRACT

An external mirror assembly for a vehicle includes a support arm adapted to be affixed to an associated vehicle side door and a housing movably mounted to the support arm. The housing has an adapter plate disposed within the housing for attachment of a glass assembly. The glass assembly includes a mirror affixed to a mirror backing plate. The mirror backing plate secures the glass assembly to the housing so that movement of the housing and glass assembly together and in tandem relative to the support arm adjusts a field of view of the mirror as viewed by an associated vehicle operator. The mirror backing plate is releasably connected to the adapter plate at a connection location which is concealed by a door removably mounted to the housing.

17 Claims, 4 Drawing Sheets

VEHICLE DOOR MIRROR ASSEMBLY

BACKGROUND

A known mirror assembly for a vehicle side door generally includes a glass assembly mounted to a housing of the mirror assembly. The glass assembly includes a mirror and a mirror backing plate that is snapped onto an adapter plate housed in the housing. The adapter plate is connected to an actuator which allows the user to adjust the position of the mirror via rotating the adapter plate. The glass assembly is typically recessed into the housing to protect the glass assembly from impacts or from becoming disconnected from the adapter plate. However, if desired, the glass assembly can still be pried off from the actuator. The glass assembly itself also conceals fasteners (i.e., screws) which fasten other housing components to the adapter plate. By snapping on the glass assembly last, the fasteners are hidden and the mirror assembly has a seamless finished appearance. For a frameless type mirror assembly, the glass assembly is extended out to be flush with a peripheral edge of the housing to give a frameless/seamless appearance. Because the glass assembly is no longer protected by being recessed in the housing, it is important to protect the glass assembly from easily detaching from the housing in the case of impact or prying. Additionally, it is important to maintain the seamless appearance of the mirror assembly without exposed attachments or screws.

BRIEF DESCRIPTION

According to one aspect, an external mirror assembly for a vehicle comprises a support arm adapted to be affixed to an associated vehicle side door and a housing movably mounted to the support arm. The housing has an adapter plate disposed within the housing for attachment of a glass assembly. The glass assembly includes a mirror affixed to a mirror backing plate. The mirror backing plate secures the glass assembly to the housing so that movement of the housing and glass assembly together and in tandem relative to the support arm adjusts a field of view of the mirror as viewed by an associated vehicle operator. The mirror backing plate is releasably connected to the adapter plate at a connection location which is concealed by a door removably mounted to the housing.

According to another aspect, a mirror assembly configured to be mounted on a support arm which is affixed to an associated vehicle side door comprises a housing having a peripheral edge that defines an opening. An adapter plate is disposed within the housing. A glass assembly is positioned within the opening. The glass assembly includes a mirror affixed to a mirror backing plate. The mirror backing plate is fastened to the adapter plate via a fastener to releasably secure the glass assembly to the housing. A door is removably mounted to an underside of the housing for concealing the fastener.

According to another aspect, a method of removing a glass assembly from a housing of an exterior mirror assembly mounted on a support arm which is affixed to an associated vehicle side door is provided. The method comprises removing a door from an underside of the housing, the door in a mounted state concealing a fastener which fastens a mirror backing plate of the glass assembly to an adapter plate housed within the housing; with the door removed, removing the fastener that connects the mirror backing plate to the adapter plate; and with the fastener removed, inserting an associated tool for detaching the glass assembly in an access cavity defined between the adapter plate and the mirror backing plate.

DETAILED DESCRIPTION

Figure 1:
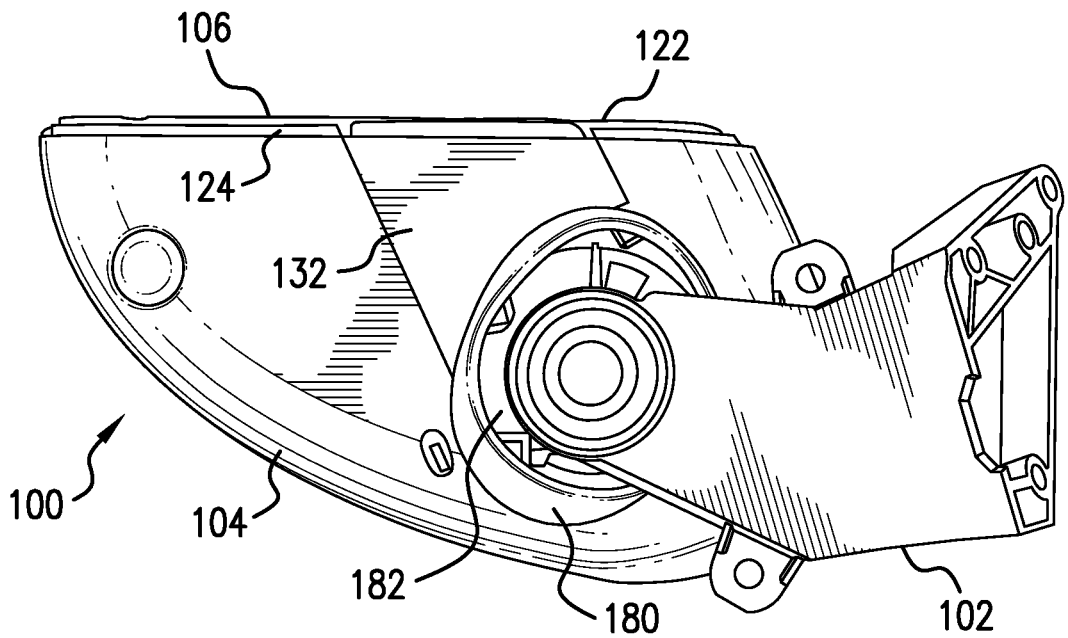
FIG. 1 is a bottom perspective view of an exemplary mirror assembly mounted on a support arm, the mirror assembly including a housing and a glass assembly mounted to the housing.
Figure 2:
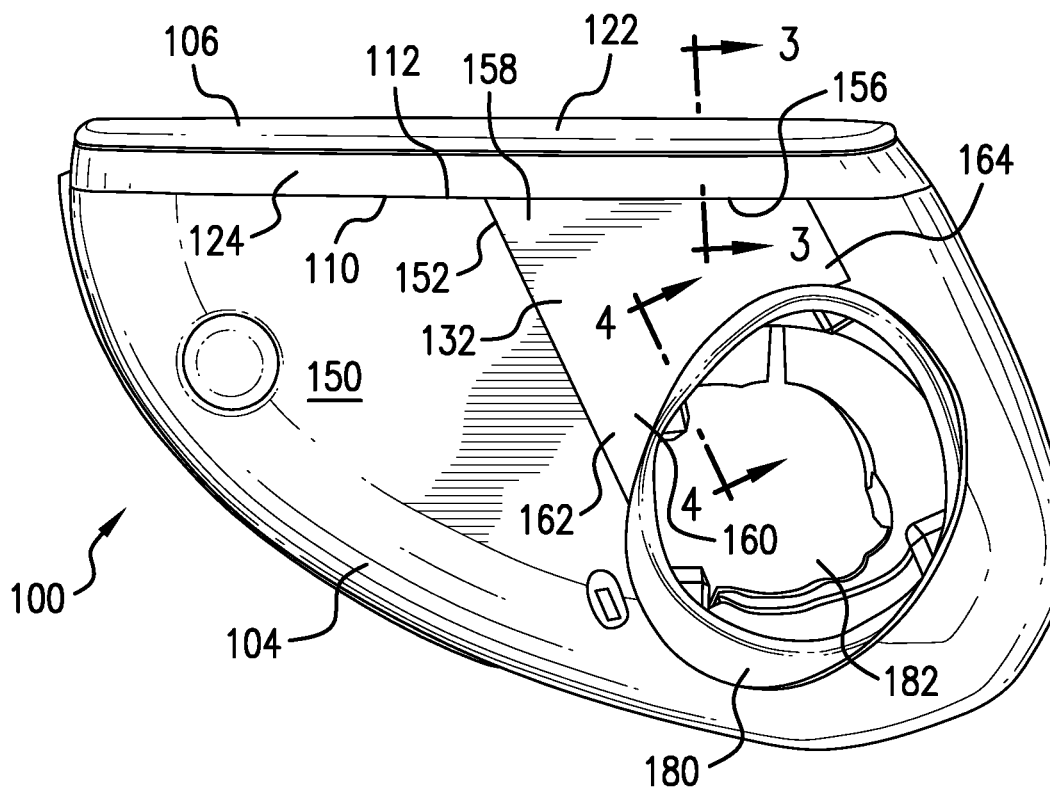
FIG. 2 is a bottom perspective view of the mirror assembly sans the support arm.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1 and 2 illustrate an exemplary external mirror assembly 100 for a vehicle according to the present disclosure. The mirror assembly 100 is attached to a base or support arm 102 adapted to be affixed to an associated vehicle side door, specifically to a forward side of a front door. The mirror assembly 100 generally includes a housing 104 movably mounted to the support arm and a glass assembly 106 attached to the housing 104. The depicted mirror assembly 100 is configured to have a frameless appearance. Specifically, a housing peripheral edge 110 of the housing 104 and a mirror peripheral edge 112 of the glass assembly 106 are sized and aligned to be flush with each other. Thus, when looking normal to the glass assembly 106, the housing 104 does not extend around any edge of the glass assembly 106, but instead is disposed behind the glass assembly.

Figure 3:
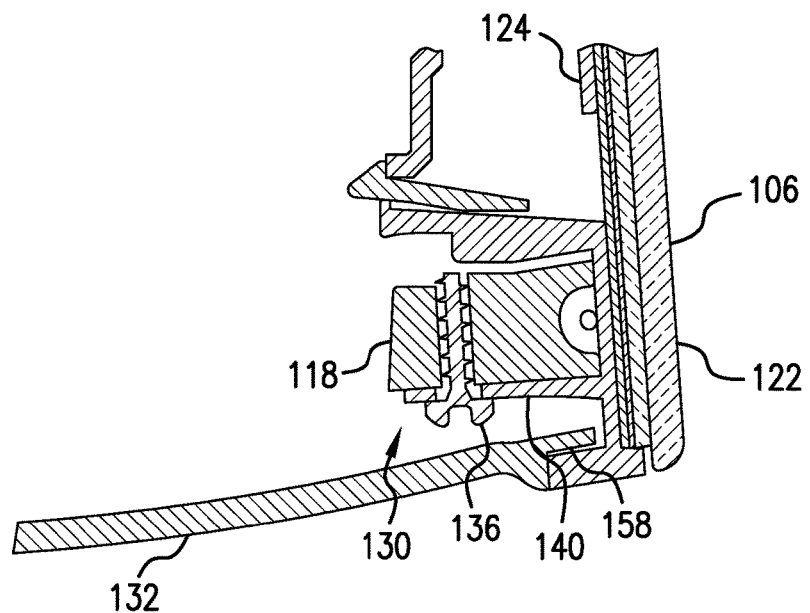
FIG. 3 is a partial cross-sectional view generally along line 3-3 of FIG. 2.

As shown in FIG. 3, an adapter plate 118 for an actuator (not shown) is attached to and disposed within the housing 104 for attachment of the glass assembly 106, thereby serving to secure the glass assembly 106 to the housing 104. According to one aspect, the glass assembly 106 includes a mirror 122 defined by a reflective glass plate; however, other materials having reflective surfaces may also be implemented as the mirror 122. Furthermore, the mirror 122 may be flat or may alternatively have a contoured surface so as to be convex or concave. The mirror 122 is affixed to a mirror backing plate 124 which, in turn, is affixed to the adapter plate 118 which secures the glass assembly 106 to the housing 104. In order to form a frameless look, the mirror backing plate 124 is extended to become a visible surface of the mirror assembly 100.

It should be appreciated that movement of the housing 104 and glass assembly 106 together and in tandem relative to the support arm 102 (via the actuator) adjusts a rearward field of view of the mirror 122 as viewed by an associated vehicle operator (i.e., the driver of the vehicle). The actuator can include any known mechanical arrangement to facilitate both vertical (i.e., up and down) and horizontal (i.e., side-to-side) adjustment of the housing 104 and glass assembly 106 relative to the support arm 102. Further, the actuator can be directly or indirectly actuated mechanically or electrically via, for example, interior switches within the vehicle interior.

As is known, the adapter plate 118 can be a full width adapter plate with a profile that substantially matches profiles of the housing 104 and the glass assembly 106 and allows for the attachment of the housing and for the glass assembly. By way of example, the adapter plate 118 can include adapter clips to hold the adapter plate against the actuator, which is attached to the housing 104, and against the mirror backing plate 124. According to the present disclosure, the adapter plate 118 is additionally attached to the mirror backing plate 124 at a connection location 130 which is concealed by a door 132 removably mounted to the housing 104. At the connection location a fastener 136 (for example, a screw) releasably connects the mirror backing plate 124 and the adapter plate 118, and with the door 132 removed from the housing 104 the fastener 136 is accessible from an underside of the housing (see FIGS. 3 and 6). In the depicted aspect, the mirror backing plate 124 includes a mounting tab 140 extending into the housing 104. The mounting tab 140 is received in a correspondingly shaped recessed portion 142 formed in the adapter plate 118. The fastener 136 extends through the mounting tab 140 and into an adapter opening 146 formed in the adapter plate 118 which releasably connects the mounting tab 140 to the adapter plate 118. The fastener 136, in conjunction with the adapter clips, serve to releasably secure the glass assembly 106 to the housing 104.

Figure 4:
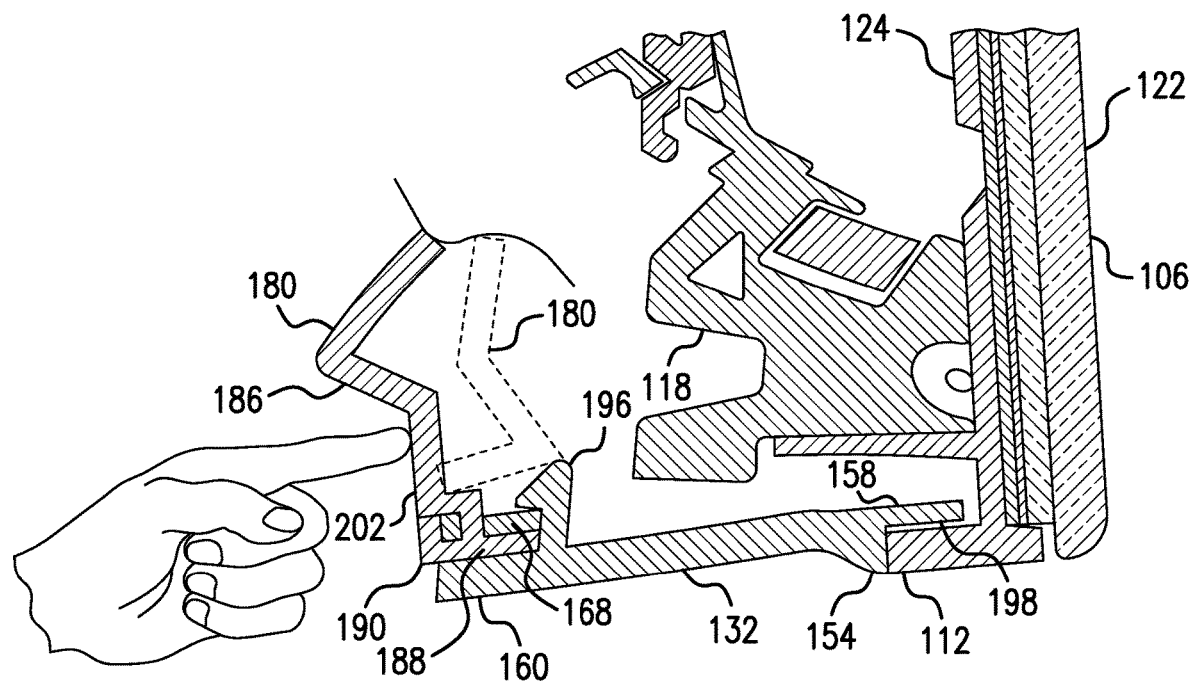
FIG. 4 is a partial cross-sectional view generally along line 4-4 of FIG. 2 according to one aspect of the present disclosure.
Figure 6:
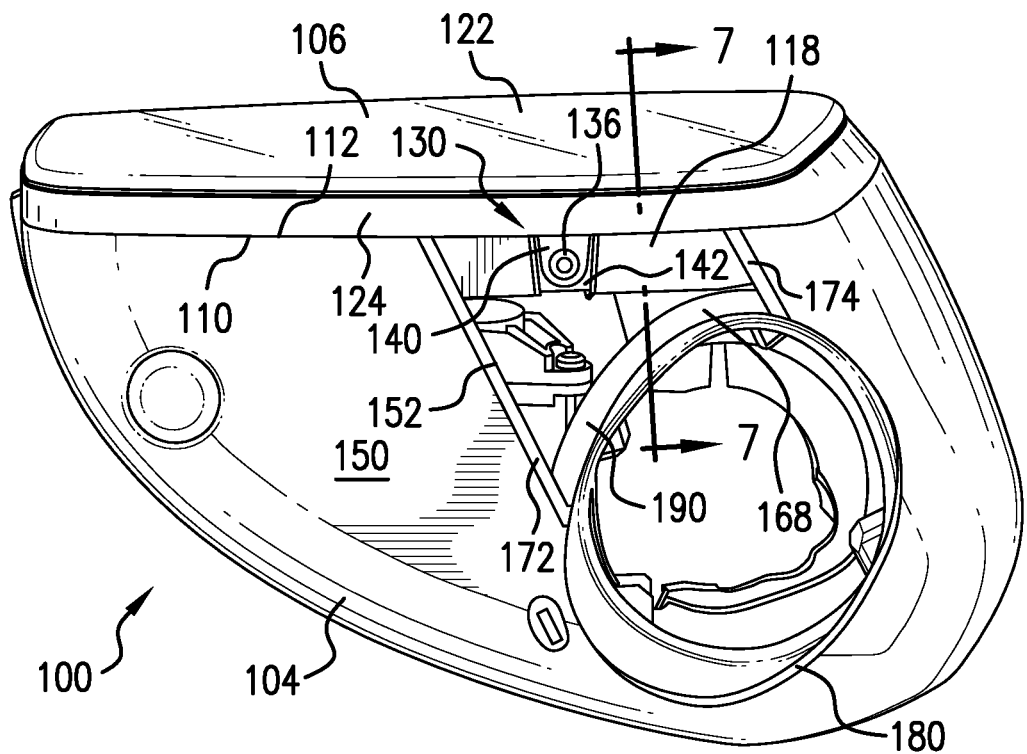
FIG. 6 is a bottom perspective view of the mirror assembly sans the support arm with a door detached from the housing of the mirror assembly.

As shown in FIGS. 2-4 and 6, an underside 150 of the housing 104 includes a cutout 152 that extends through the peripheral edge 110 of the housing. The cutout 152 is sized to receive the door 132, and the door is shaped to substantially conform to the underside 150 of the housing 104 so that the peripheral edge 112 of the glass assembly 106 (specifically the mirror backing plate 124) is substantially flush with both the peripheral edge 110 of the housing and a peripheral edge 154 of the door 132. This provides a seamless appearance for the housing 104 and door 132. Further, the door 132 includes a forward end portion 158, a rear end portion 160 and side portions 162, 164. The forward end portion 158 is configured to be supported by the peripheral edge 112 of the glass assembly 106. The rear end portion 160 is configured to be supported by a connector 168 located at least partially within the housing 104, the connector 168 adapted to releasably engage the door 132. The side portions 162, 164 are supported against ledges 172, 174 formed on the housing 104. A gasket or seal member 180 is at least partially mounted within an opening or aperture 182 in the underside 150 of the housing 104 for surrounding an interface between the support arm 102 and the housing 104. The seal member 180 generally seals or closes over the aperture 182 to limit water or dirt intrusion into the housing 104. The seal member 180 is formed of a flexible material and is designed to allow for movement of the housing 104 relative to the support arm 102 and to protect the internal components of the mirror assembly 100 from water and contamination. Regarding the connector 168, in the depicted embodiment, the connector 168 is formed as part of the seal member 180. As shown in FIG. 4, the seal member 180 includes a sidewall 186 having a mounting flange 188 at an end portion that is received in the housing 104. In FIG. 6, the cutout 152 for the door 132 extends into the aperture 182 exposing a part of the seal member 180. Accordingly, a majority section of the mounting flange 188 is secured to an inner surface of the housing 104 except for an exposed section 190 which extends through the cutout 152. The connector 168 is provided by this section 190 of the mounting flange 188, and as shown in FIG. 4, the connector 168 is fixed to (for example, formed integral with) the section 190 and is flush with an outer edge of the section 190.

Figure 5:
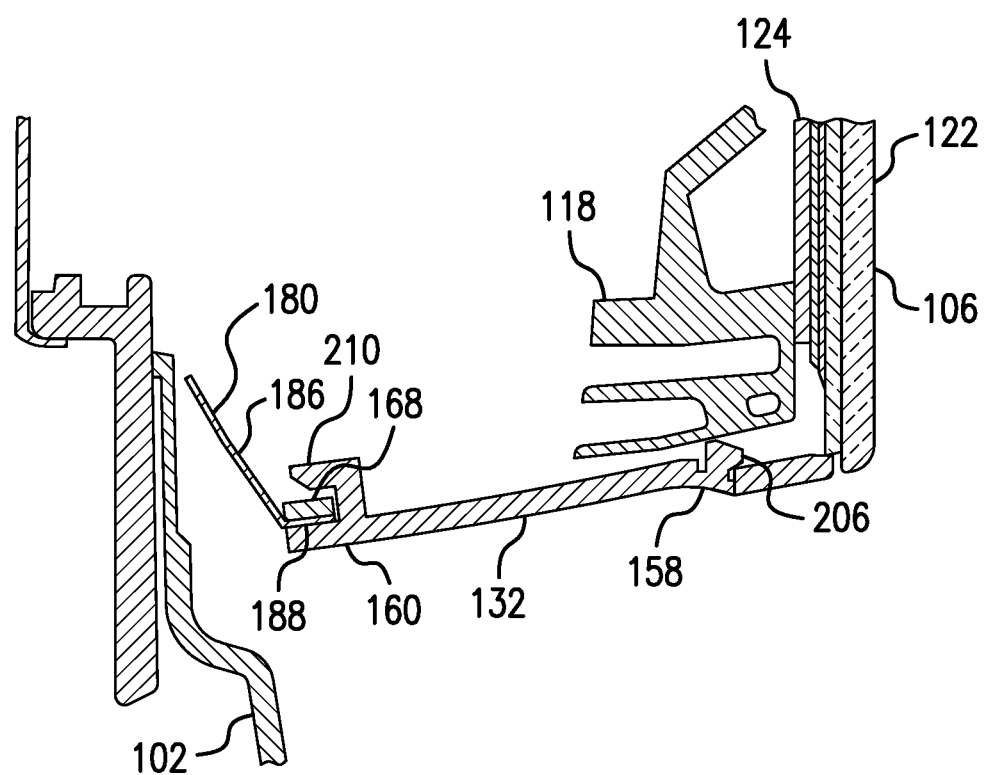
FIG. 5 is a partial cross-sectional view of FIG. 2 according to another aspect of the present disclosure.

According to the embodiment depicted in FIG. 4, the rear end portion 160 of the door 132 includes a mounting tab 196 and the connector 168 is adapted to releasably engage the mounting tab 196. According to one aspect, the mounting tab 196 is sized to sandwich between the mounting tab 196 and an inner surface of the door 132 both the connector 168 and the section 190 of the mounting flange 188. The forward end portion 158 of the door 132 includes an offset section 198 that engages an inner surface of the mirror backing plate 124. It should be appreciated that the offset section 198 can be sized to be flush with the mirror backing plate 124 which, in turn, provides a seamless transition from the glass assembly 106 to the door 132. Further illustrated, the seal member 180 is configured to deflect toward the door 132 (for example, by a finger of a technician pressing against an inner surface 202 of the sidewall 186 at or near the section 190), and deflection of the seal member 180 disengages the connector 168 from the mounting tab 196. With the connector 168 disengaged, the door 132 can be easily removed from the housing 104 to provide access to the fastener 136. However, it should be appreciated that alternative manners for securing the door 132 to the housing 104 are contemplated. By way of example, according to the aspect depicted in FIG. 5, the forward end portion 158 of the door 132 includes a mounting tab 206 adapted to engage the mirror backing plate 124, and the connector 168 is adapted to releasably engage a flange 210 provided on the rear end portion 160 of the door. With this configuration, to remove the door 132 the forward end portion 158 is first disengaged from the mirror backing plate 124.

Figure 7:
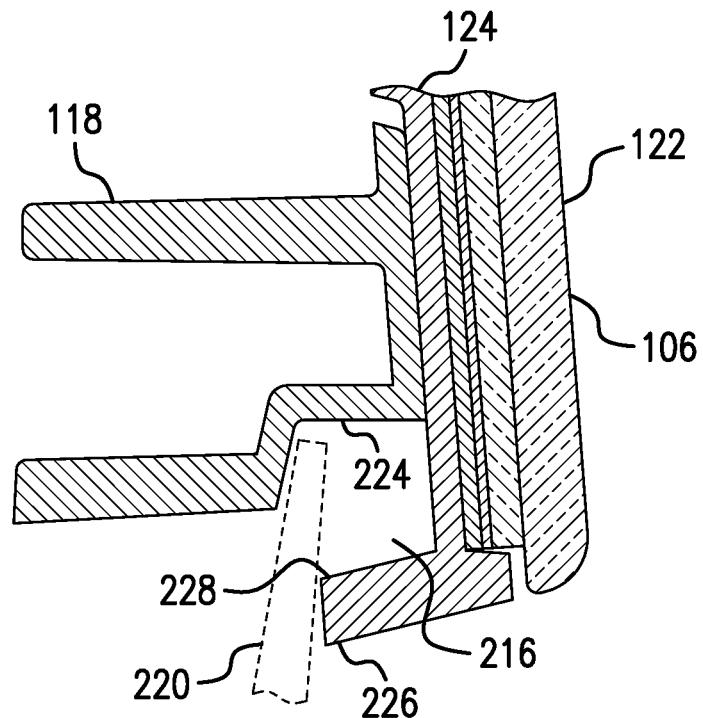
FIG. 7 is a partial cross-sectional view generally along line 7-7 of FIG. 6.

With reference to FIGS. 6 and 7, an access cavity 216 is defined between the adapter plate 118 and the mirror backing plate 124, and with the door 132 removed from the housing 104 the access cavity 216 is sized to receive an associated tool 220 for detaching the glass assembly 106 from the housing 104 (after the fastener 136 is removed). In the depicted aspect, the adapter plate 118 includes a step portion 224 that at least partially defines the access cavity 216. The step portion includes a first contact surface for engagement with the associate tool 200. The mirror backing plate includes a peripheral wall 226 for engagement with the housing 104. A section 228 of the peripheral wall 226 at least partially defines the access cavity 216 and includes a second contact surface for engagement with the associate tool 200. It should be appreciated that wedging the associated tool 200 between the first and second contact surfaces pries the glass assembly 106 from the housing 104.

As is evident from the present disclosure, the fastener 136 is used to secure the glass assembly 106 to safeguard against the glass assembly detaching from the adapter plate 118. The fastener 136 extends through the mounting tab 140 on the mirror backing plate 124 and threads into the adapter plate 118. This fastener 136 must be removed in order to remove the glass assembly 106 from the housing 104. The fastener 136 is applied on the underside 150 of the housing 104 to help with manufacturability and service. From the underside 150, the fastener 136 is visible and can be easily reached with an appropriate tool (for example, a screwdriver). The access cavity 216 provided between the glass assembly 106 and adapter plate 118 allows for the use of a screwdriver or similar tool 200 to disengage the glass assembly 106 from the adapter plate 118. The fastener 136 and access cavity 216 are concealed by the door 132, which is secured to the housing 104 and/or surrounding parts. The door 132 also hides the internal components of the mirror assembly 100 and creates a finished appearance. The door attachment is designed to be easily removed from service, but has sufficient retention force to prevent unwanted detachment. The present disclosure provides numerous advantages, including, but not limited to, the glass assembly 106 is secured from falling off during an impact or being easily removed by the addition of the fastener 136; the access cavity 216 allows for easy removal of the glass assembly when desired; the fastener 136 is visible and easy to access with an appropriate tool; the door 132 is the final install step and creates a finished final appearance; and the door 132 is removable from the housing 104 to begin the disassembly process.

As is further evident for the foregoing, a method of removing a glass assembly 106 from a housing 104 of an exterior mirror assembly 100 mounted on a support arm 102 which is affixed to an associated vehicle side door is provided. The exemplary method comprises removing a door 132 from an underside 150 of the housing 104, the door 132 in a mounted state concealing a fastener 136 which fastens a mirror backing plate 124 of the glass assembly 106 to an adapter plate 118 housed within the housing 104; with the door 132 removed, removing the fastener 136 that connects the mirror backing plate 124 to the adapter plate 118; and with the fastener 136 removed, inserting an associated tool 200 for detaching the glass assembly 106 in an access cavity 216 defined between the adapter plate 118 and the mirror backing plate 124. According to one aspect, the step of removing the door 132 includes pressing a seal member 180 mounted to the underside 150 of the housing 104 so that a connector 168 defined by the seal member 180 disengages from a mounting tab 196 provided on the door 132. According to another aspect, the step of removing the door 132 includes disengaging a mounting tab 206 provided on the door 132 from a peripheral wall of the mirror backing plate 124.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An external mirror assembly for a vehicle comprising:
a support arm adapted to be affixed to an associated vehicle side door;
a housing movably mounted to the support arm, the housing having an adapter plate disposed within the housing for attachment of a glass assembly;
the glass assembly including a mirror affixed to a mirror backing plate, the mirror backing plate securing the glass assembly to the housing so that movement of the housing and glass assembly together and in tandem relative to the support arm adjusts a field of view of the mirror as viewed by an associated vehicle operator,
wherein the mirror backing plate is releasably connected to the adapter plate at a connection location which is concealed by a door removably mounted to the housing;
a connector located at least partially within the housing, the connector adapted to releasably engage the door; and
a seal member surrounding an interface between the support arm and the housing, the connector is formed as part of the seal member.

2. The mirror assembly of claim 1, wherein at the connection location a fastener releasably connects the mirror backing plate and the adapter plate, and with the door removed from the housing the fastener is accessible from an underside of the housing.

3. The mirror assembly of claim 2, wherein the mirror backing plate includes a mounting tab, the fastener releasably connects the mounting tab to the adapter plate.

4. The mirror assembly of claim 2, wherein an access cavity is defined between the adapter plate and the mirror backing plate, and with the door removed from the housing the access cavity is sized to receive an associated tool for detaching the glass assembly from the housing.

5. The mirror assembly of claim 4, wherein the adapter plate includes a step portion that at least partially defines the access cavity, the step portion includes a first contact surface for engagement with the associate tool, and the mirror backing plate includes a peripheral wall for engagement with the housing, a section of the peripheral wall at least partially defines the access cavity and includes a second contact surface for engagement with the associate tool.

6. The mirror assembly of claim 1, wherein an underside of the housing includes a cutout that extends through a peripheral edge of the housing, the cutout is sized to receive the door, and the door is shaped to substantially conform to the underside of the housing so that a peripheral edge of the mirror backing plate is substantially flush with both the peripheral edge of the housing and a peripheral edge of the door.

7. The mirror assembly of claim 1, wherein a rear end portion of the door include a mounting tab, and the connector is adapted to releasably engage the mounting tab, and a forward end portion of the door engages a peripheral wall of the mirror backing plate.

8. The mirror assembly of claim 7, wherein the seal member is configured to deflect toward the door, and deflection of the seal member disengages the connector from the mounting tab.

9. The mirror assembly of claim 1, wherein a forward end portion of the door include a mounting tab engaging a peripheral wall of the mirror backing plate, and the connector is adapted to releasably engage a rear end portion of the door.

10. A mirror assembly configured to be mounted on a support arm which is affixed to an associated vehicle side door, the mirror assembly comprising:
a housing having a peripheral edge that defines an opening;
an adapter plate disposed within the housing;
a glass assembly positioned within the opening and at least partially extended forward from the housing periphery edge, the glass assembly including a mirror affixed to a mirror backing plate, the mirror backing plate is fastened to the adapter plate via a removable threaded fastener to releasably secure the glass assembly to the housing; and
a door removably mounted to an underside of the housing for concealing the fastener,
wherein the underside of the housing includes a cutout sized to receive the door, the door includes a forward end portion supported by one of the housing and the mirror backing plate, a rear end portion supported by a connector located at least partially within the housing, and side portions supported by the underside of the housing.

11. The mirror assembly of claim 10, further including a seal member mounted within an aperture in the underside of the housing, the seal member includes the connector adapted to releasably engage the door.

12. The mirror assembly of claim 11, wherein the door includes a mounting tab, and the connector is adapted to releasably engage the mounting tab, wherein the seal member is configured to deflect toward the door, and deflection of the seal member disengages the connector from the mounting tab.

13. The mirror assembly of claim 11, wherein the door includes a mounting tab adapted to engage a peripheral wall of the mirror backing plate.

14. The mirror assembly of claim 10, wherein the mirror backing plate includes a mounting tab, the fastener releasably connects the mounting tab to the adapter plate.

15. The mirror assembly of claim 10, wherein an access cavity is defined between the adapter plate and the mirror backing plate, and with the door removed from the housing the access cavity is sized to receive an associated tool for detaching the glass assembly from the housing.

16. A method of removing a glass assembly from a housing of an exterior mirror assembly mounted on a support arm which is affixed to an associated vehicle side door, the method comprising:

removing a door from an underside of the housing, the door in a mounted state concealing a fastener which fastens a mirror backing plate of the glass assembly to an adapter plate housed within the housing;

with the door removed, removing the fastener that connects the mirror backing plate to the adapter plate; and with the fastener removed, inserting an associated tool for detaching the glass assembly in an access cavity defined between the adapter plate and the mirror backing plate, wherein the step of removing the door includes disengaging a mounting tab provided on the door from a peripheral wall of the mirror backing plate.

17. The method of claim 16, wherein the step of removing the door includes pressing a seal member mounted to the underside of the housing so that a connector defined by the seal member disengages from a mounting tab provided on the door.

* * * * *